United States Patent [19]

Nishikata et al.

[11] 4,375,722
[45] Mar. 8, 1983

[54] VERNIER CALIPER

[75] Inventors: Goro Nishikata; Kozo Shibukawa, both of Kawasaki, Japan

[73] Assignee: Kabushiki Kaisha Mitutoyo Seisakusho, Tokyo, Japan

[21] Appl. No.: 221,509

[22] Filed: Dec. 30, 1980

Related U.S. Application Data

[63] Continuation of Ser. No. 56,609, Jul. 11, 1979, abandoned.

[51] Int. Cl.³ .............................................. G01B 5/02
[52] U.S. Cl. ............................. 33/143 M; 33/147 T
[58] Field of Search ............ 33/143 M, 143 R, 143 J, 33/143 K, 147 R, 147 H, 147 G, 147 T, 147 J, 158, 159, 169, 170

[56] References Cited

U.S. PATENT DOCUMENTS

| | | | |
|---|---|---|---|
| 1,515,266 | 11/1924 | Mitchell | 308/72 |
| 2,531,334 | 11/1950 | Grenat | 308/15 |
| 2,741,848 | 4/1956 | Livingston | 33/143 K X |
| 3,228,287 | 1/1966 | Bizzoco et al. | 33/170 X |
| 3,302,294 | 2/1967 | Eguchi | 33/147 |
| 4,077,129 | 3/1978 | Nishikata | 33/147 T |
| 4,136,455 | 1/1979 | Owsen | 33/147 F |

FOREIGN PATENT DOCUMENTS

| | | | |
|---|---|---|---|
| 54681 | 12/1921 | Sweden | 33/143 M |
| 7454 | of 1902 | United Kingdom | 33/143 M |
| 632671 | 11/1949 | United Kingdom | 33/143 K |

Primary Examiner—Harry N. Haroian
Attorney, Agent, or Firm—Brisebois & Kruger

[57] ABSTRACT

A vernier caliper includes a main beam body consisting of two round rods parallel to each other and connected together at one end by a jaw, and at the other end by a rear frame. A vernier is supported freely and slidably on the rods. The rods can be hollow and can have their respective ends inserted into openings of the jaw and rear frame and secured in the openings with adhesive, solder, or screws. A rack can be formed on one of the rods to drive, for example, a dial indicator, and graduations can be provided on a rod to read the measurement taken with the vernier. This construction provides a more accurate vernier caliper which can be precisely assembled without grinding, for example, jaw faces, after assembly to calibrate the caliper.

3 Claims, 12 Drawing Figures

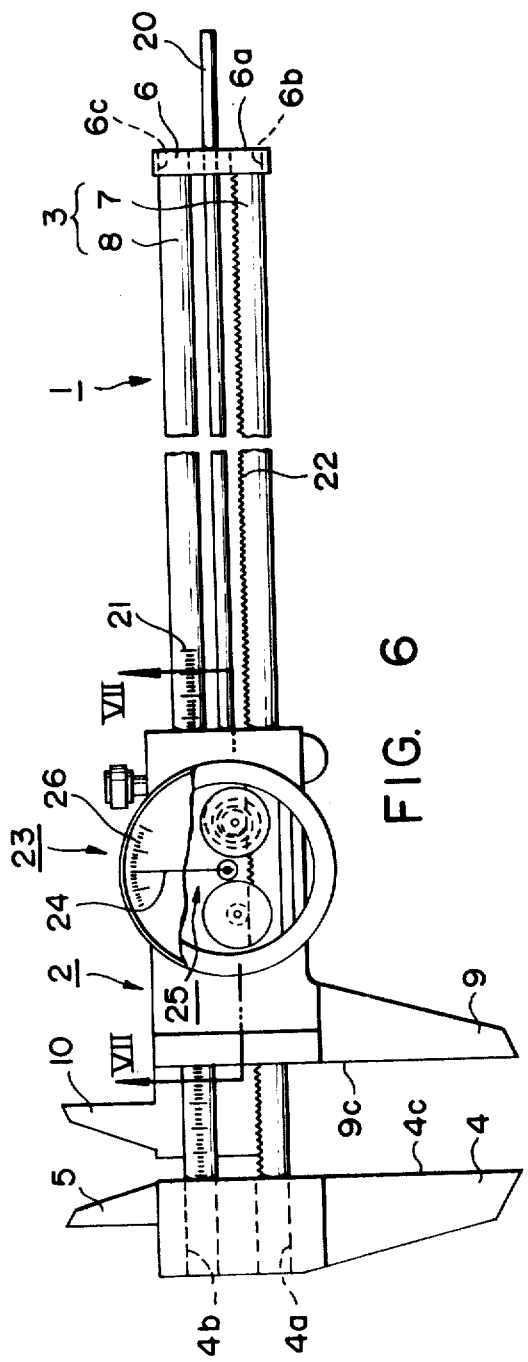
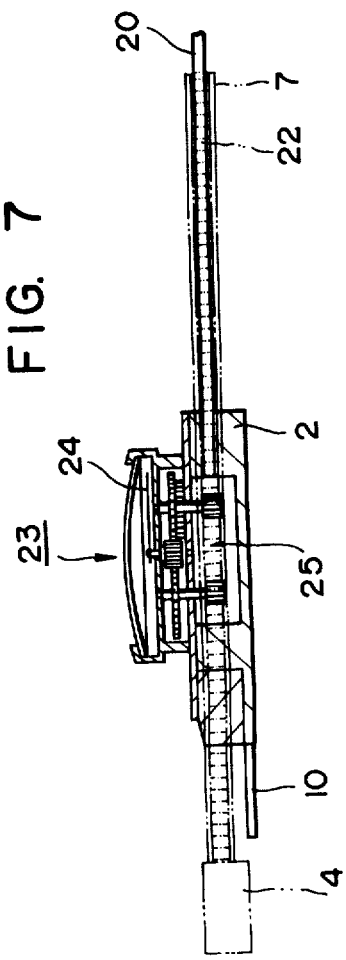
FIG. 6
FIG. 7

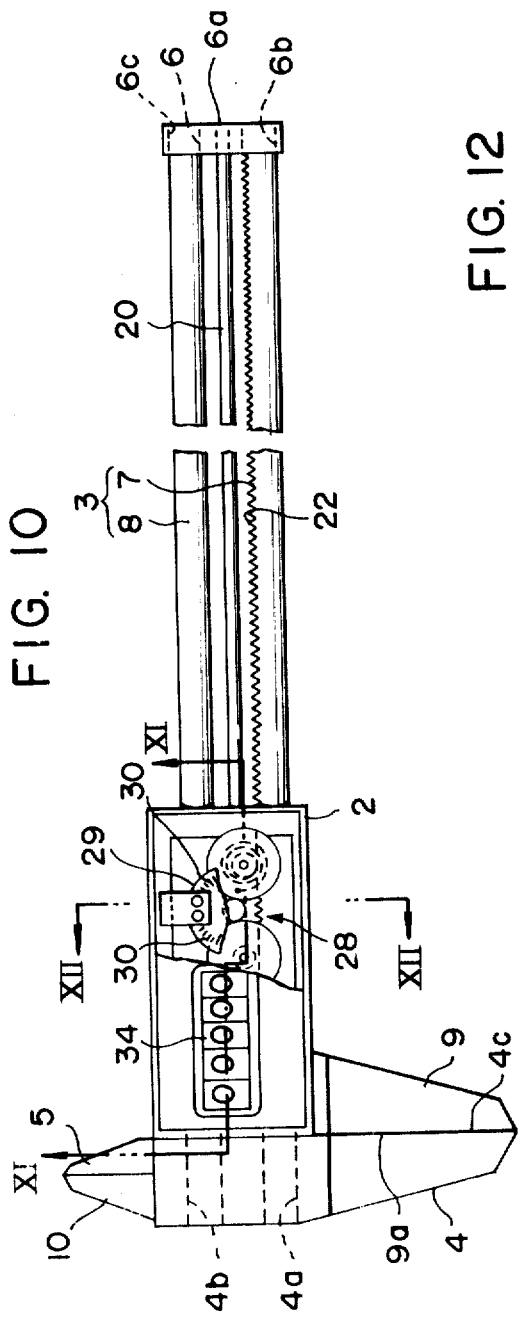
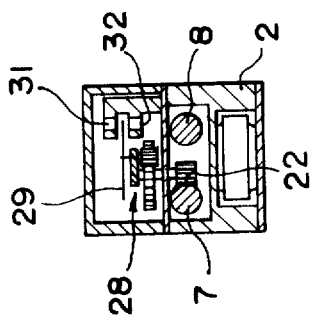
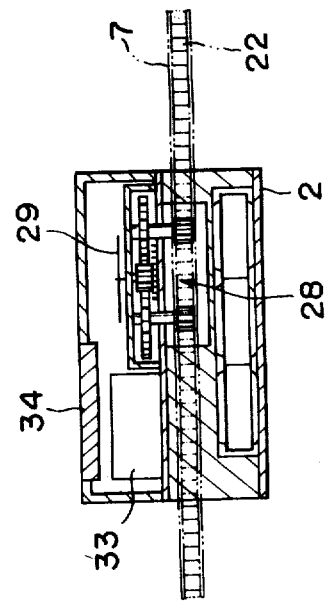

VERNIER CALIPER

This is a continuation of application Ser. No. 56,609, filed July 11, 1979, now abandoned.

BACKGROUND OF THE INVENTION

The present invention relates to a vernier caliper with unique features in the construction of its main beam.

The main beam in the conventional vernier calipers usually consists of a main beam body made from thin plate material with an external jaw and an internal jaw formed integral with the main beam body. The main beam is made by punching out a sheet metal blank roughly to its shape with a press machine; then machining and grinding the blank.

But the main beam made in this way has to be machined on all its faces; and because its shape is complicated because of the external jaw and the internal jaw on it, and since the main beam is made of highly wear-resistant metal, machining of the main beam body is difficult and laborious. Furthermore, because the metal of the main beam body is relatively thin, there developed the problem of warpage of the body that is caused by the heat generated in the machining. There has been also the problem in the conventional vernier calipers that error in reading the measured value is liable to develop because, in order to fit the vernier on the main beam body to slide, some play is provided between them in the directions of the plate thickness and width of the main beam.

SUMMARY OF THE INVENTION

The object of the present invention is to provide a vernier caliper in which the main beam body slidably supporting the vernier consists of two pieces of round rods, thus reducing machining processes and, furthermore, making exact and accurate machining easy, and which is not liable to bend as a result of heat generated in its machining.

Another object of the invention is a vernier caliper that has light weight main beam body portions in the form of hollow pipes or tubes.

Still another object of the invention is to provide a vernier caliper in which a stopper or rear frame is pierced with two parallel holes and ends of the two pieces of round rods are inserted into the two holes and fixed in the holes by a fixing means to form a rigid assembled body. When connecting, in this way, the two pieces of round rods to the stopper, the position of the stopper relative to the rods is adjusted so that in the fixed position, the end face of the stopper that is to be the standard plane for measuring depth will be precisely positioned. Therefore, the amount of projection of the depth bar from the standard plane for measuring depth can be easily matched and preset to the graduation on the scale of the main beam without grinding the depth bar and the standard plane.

Still another object of the invention is to provide a vernier caliper in which an external measuring jaw of the main beam is pierced with two parallel holes, and ends of the two pieces of round rods are inserted into these two holes and fixed to connect the two ends to the external jaw on the main beam. When connecting the two round rods, the measuring faces of the external jaw and vernier are set together and aligned, thus eliminating the previously required grinding of these two measuring faces of the measuring jaws after the vernier is assembled to the main beam.

Still another object of the invention is to provide a vernier caliper in which the ends of the round rods inserted into the stopper and/or the external jaw of the main beam are adhered or soldered by fixing means such as an adhesive or a soldering material, thereby integrally connecting the two rods without producing strain in the surfaces of the two rods.

Still another object of the invention is a vernier caliper in which both ends of the round rods inserted into the stopper or the external jaw are fixed in their holes by a fixing means such as screws or other similar parts, thus connecting the rods to them to form one body without producing strain in the surfaces of the rods and allowing disassembly of the rods.

Still another object of the invention is a vernier caliper in which a bush is slidably fit on each of the two rods, the bushes are loosely inserted into two parallel holes made in the vernier, and the bushes are fixed in the two vernier holes with an adhesive or solder, thus allowing the vernier to be slidably supported on the main beam body that consists of two round rods, even if a small error exists in parallelism of the two vernier holes.

Still another object of the invention is a vernier caliper in which a transparent scale plate mounted on the vernier has a scale groove with arch-shaped cross-section that is adjacent to and facing the scale of a round rod and extends along its length, and the scale groove has vernier graduations, thus allowing scale readings without parallax error.

Still another object of the invention is a vernier caliper in which a depth bar is installed between the two round rods that make up the main beam bodies, thus eliminating the groove previously required to be formed on the main beam body for accommodating the depth bar.

Still another object of the invention is a vernier caliper in which a rack is formed on one of the two round rods of the main beam body, and the rack is in mesh with the pinion of a device to indicate the amount of vernier shift, whereby the rack is easily and simply provided for the main beam body with no necessity of forming a rack independently of the main beam body and fastening it in a groove, etc. in the main beam body.

These objects, features and advantages of the invention will become more apparent by consideration of the detailed specification that follows and the accompanying drawings.

BRIEF DESCRIPTION OF THE DRAWINGS

FIG. 6 is a plan view of a second embodiment of the vernier caliper of the invention with portions cut away for illustration;

FIG. 7 is a view in section taken along line VII—VII of FIG. 6;

FIG. 10 is a plan view of a fourth embodiment showing a vernier caliper with portions cut away;

FIG. 11 is a view in section taken along line XI—XI of FIG. 10; and

FIG. 12 is a view in section taken along line XII—XII of FIG. 10.

DETAILED DESCRIPTION OF THE PREFERRED EMBODIMENTS

The following description explains embodiments of the present invention shown in the accompanying drawings.

Figure 1:
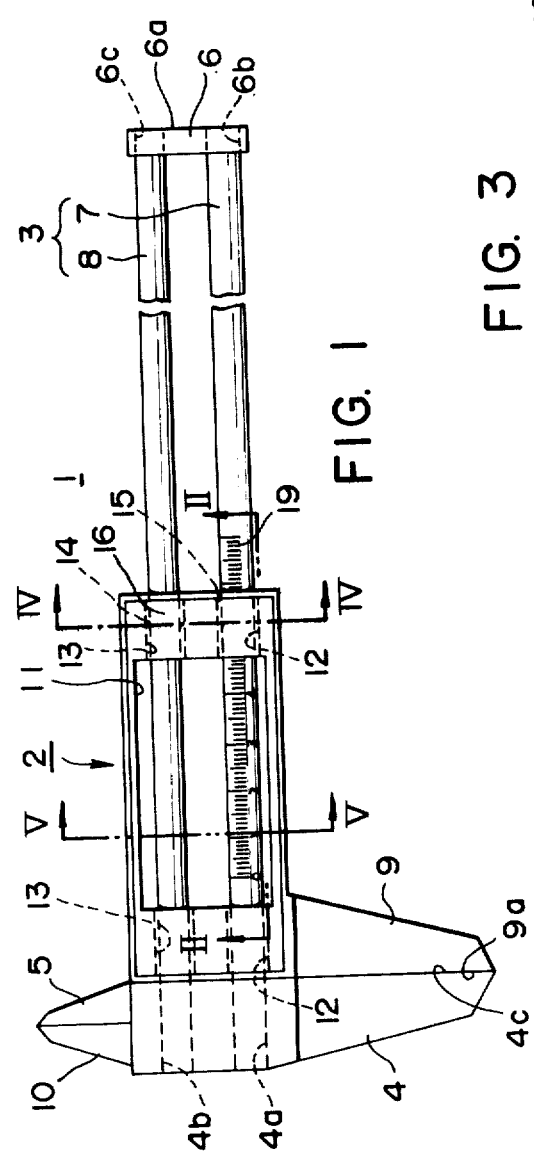
FIG. 1 is a plan view of a first embodiment of the invention.
Figure 3:
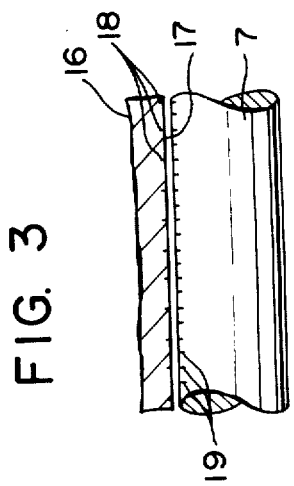
FIG. 3 is an enlarged partial view of a portion of FIG. 2.
Figure 2:
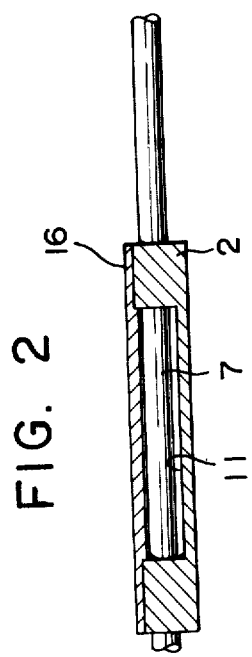
FIG. 2 is a view in section taken along the line II—II of FIG. 1.

FIGS. 1 to 5 show a first embodiment of the present invention. In FIG. 1, 1 is a main beam of a vernier caliper and 2 is a vernier. The main beam 1 consists of a main beam body 3 extending longitudinally, an external measuring jaw 4 fixed on one end of the main beam body 3, an internal jaw 5 integral with the external jaw and a stopper or rear frame fixed on the end of the main beam body 3. The stopper or rear frame 6 prevents the vernier 2 from coming off the main beam body 3.

The main beam body 3 consists of two round rods 7 and 8 which extend lengthwise and parallel to each other. Because the external measuring jaw 4 and the stopper 6 fix both ends of the rods 7 and 8, the distance between the round rods 7 and 8 and their parallelism are kept constant. The round rods may be either solid or hollow, but their outer diameter and their right-angled degree are made to be accurate.

The main beam body 3 can be made light in weight by using hollow pipes or tubes for the rods 7 and 8. The material of the rods is wear resistant hard metal.

Because round rods can be easily ground with a grinding machine, simple and exact machining can be achieved by only one grinding of their outer round surfaces. Since the caliper body 3 consists of the round rods 7 and 8 only, the bending of the rods 7, 8 due to heat generated in grinding them can be prevented.

The ends of the rods 7, 8 go into parallel holes 6b and 6c provided in the stopper 6, and they are there adhered or soldered by a suitable fixing material such as an adhesive, solder, or the like, to the stopper 6. Accordingly, no grinding to finish the end face 6a of the stopper 6, which is to be the standard plane for depth measurement, is required, and it becomes easy to match the amount of projection of a depth bar (later mentioned) from the standard plane to the depth reading on the caliper body scale by adjusting the installed position of the stopper 6 relative to the rods 7 and 8 at the time they are joined, and fixed together.

The other ends of the round rods 7 and 8 go into holes 4a and 4b which are parallel to each other and are pierced in the external measuring jaw 4. These ends are fixed by an adhesive or solder or other fixing materials in the holes 4a and 4b. These holes 4a, 4b are so dimensioned that there are clearances between the holes 4a, 4b and the round rods 7, 8. Thus, when the other ends of the rods 7 and 8 are adhered or soldered to the holes 4a, 4b of the external measuring jaw 4, matching of the measuring faces 4c and 9a of the external measuring jaws 4 and 9 respectively can be easily achieved, without additional grinding of the faces 4c and 9a after the external jaw 4 is fixed to the rods 7, 8, by meeting both faces 4c and 9a together while the rods 7, 8 are held in parallel.

The measuring jaw 4 and the stopper 6 can be joined to the ends of the rods 7 and 8 by screws, so that the rods can be disassembled.

Since, as mentioned above, the rods 7 and 8 are fixed to the stopper 6 and the measuring jaw 4 by fixing means such as adhesive pasting, soldering material, or screws, no strain is produced in the round rods 7, 8 when they are fixed to the external jaw 4 or the stopper 6.

Figure 4:
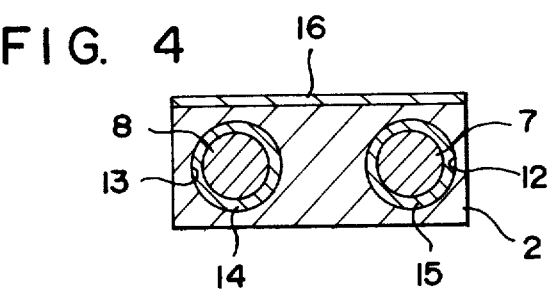
FIG. 4 is an enlarged view in section taken along line IV—IV of FIG. 1.

An external measuring jaw 9 and an internal jaw 10 are integrally formed with the vernier 2. In the middle section of the vernier 2 there is a square depression in the form of a recess 11 that is open on one side. A pair of spaced apart longitudinal holes 12 and 13 penetrate through the ends of the vernier 2 at certain intervals (FIG. 4). Bushes 14 and 15 are inserted into and fixed in the parallel holes 12 and 13 in the vernier with an adhesive and the like, and the round rods 7 and 8 are slidable through the bushes. At the time of assembly, a clearance is provided between the bushes 14, 15 and the holes 12, 13. In this way, even if there is a little error in the parallelism between the holes 12 and 13, or there is a roughness in the machining inside the holes, the vernier can be precisely slidably assembled to the main beam body 3, by fixing the bushes 14, 15 in the vernier 2 while the round rods 7 and 8 pass through the bushes 14 and 15.

Figure 5:
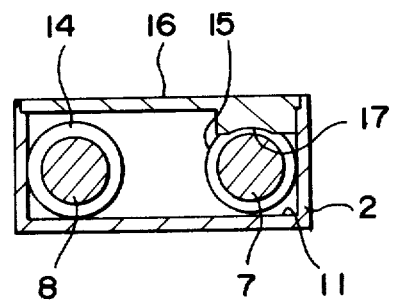
FIG. 5 is an enlarged view in section taken along line V—V of FIG. 1.

The depression 11 of the vernier 2 is covered by a transparent scale plate 16 which is made of resin material and cemented to the vernier 2, (FIGS. 2-5). The surface of the scale plate 16 that lies facing the round rod 7 is formed with a scale groove 17 which extends longitudinally of the rod 7 and has the cross section of an arch, (FIG. 5). This scale groove 17 is adjacent to the rod 7. In the scale groove 17, vernier scales 18 are provided in the longitudinal direction with certain intervals. On the surface of the round rod 7 facing the scale groove, scales 19 of the main beam are provided, in the longitudinal direction of the rod 7, with certain intervals. By this scale arrangement, parallax in reading scales will not occur between the scales 18 and 19.

In the vernier caliper with the above explained construction, when moving the vernier 2 in the longitudinal direction of the main beam body 3, the vernier 2 can shift or slide smoothly along the main beam body 3, because the round rods 7, 8 and the bushes 14, 15 are smoothly and slidably contacted. When an object to be measured is held between the measuring jaws 4 and 9 of the vernier caliper, a metting point of the scale 19 of the main beam 1 and the scale 18 of the vernier 2 becomes an outer diameter or length of the object to be measured and is indicated as a measured value on the vernier 2.

In the embodiment of the present invention so far explained, a depth bar was not provided on the vernier 2. As shown in FIGS. 6, 7, to the vernier 2 can be attached a depth bar 20 which is positioned between the round rods 7 and 8 and extends through a hole in the central portion of the stopper 6. In this case, the end face 6a of the stopper 6 becomes the standard plane for the depth bar 20. By placing the depth bar 20 between the round rods 7 and 8, there is no necessity of machining a groove to accommodate it in the round bars 7 and 8 of the main beam body 3.

Figure 8:
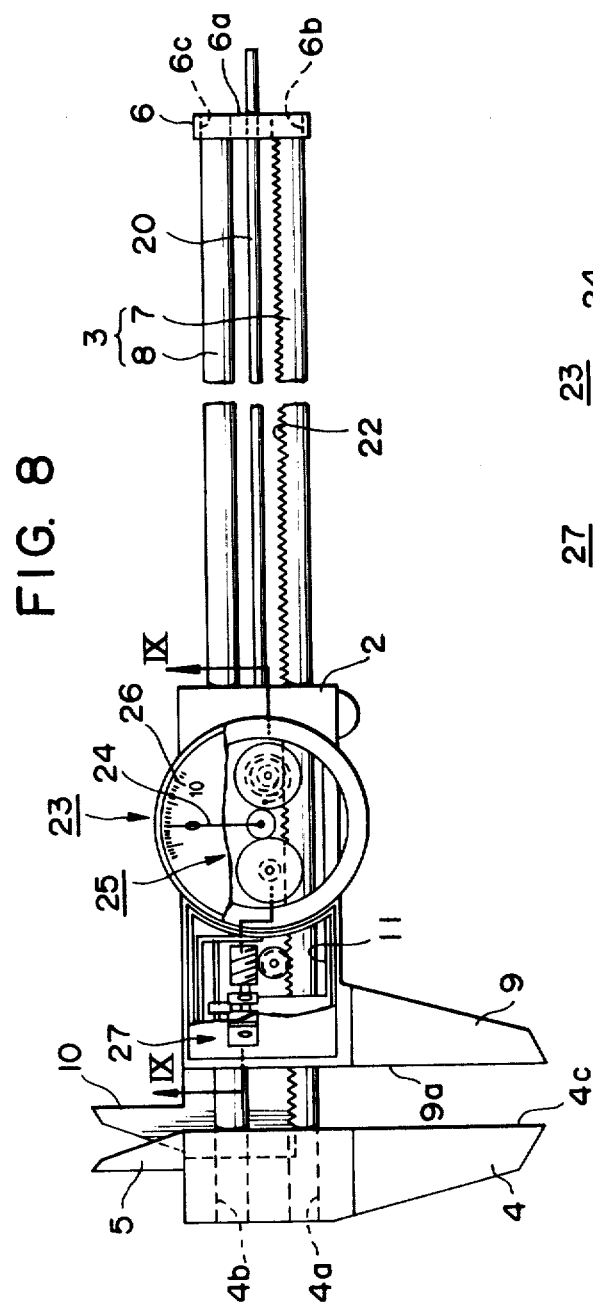
FIG. 8 is a plan view of a third embodiment of a vernier caliper of the invention with portions cut away for illustration.
Figure 9:
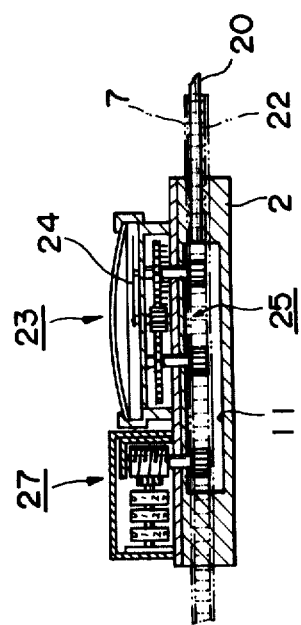
FIG. 9 is a view in section taken along line IX—IX of FIG. 8.

In the embodiment of FIG. 1 of the present invention above explained, measured values are read off from the scale 19 of the main beam 1 and the scale 18 of the vernier 2. The means to read the measured values are not necessarily limited to such scales. As shown in FIGS. 6, 7, the scale 21 for reading the movement of the vernier 2 in millimeter units is provided on the round rod 8, and a rack 22 is formed on the round rod 7 along its length, and a pointer 24 of a dial indicator 23 mounted on the vernier 2 is interconnected and interlocked through a series of gears 25 with the rack 22 so as to indicate the movement of the vernier 2 in 1/100 mil. units by the pointer 24 and the scale 26 of the dial indicator 23. As shown in the construction of FIGS. 8 and 9, the movement of the vernier 2 in millimeter units can be read from the counting device 27 interlocking with the rack 22 and additionally the movement of the vernier 2 in 1/100 millimeter units can be read from the dial indicator 23 interlocking with the rack 22.

In another arrangement, to read the movement of the vernier 2, as shown in FIGS. 10 and 11, a slitted disc 29 is rotatably supported on the vernier 2 interlocking through a series of gears 28. On the slitted disc 29, plural radial slits 30 are formed near the periphery and at certain circumferential intervals. On the vernier 2, a photoelectric convertor element 31 and a luminous element 32 are attached facing each other with the slit disc 29 in between them, and the photo-electric convertor element 31 and a liquid crystal digital indicator 34 are connected through a pulse counter 33 which counts the current pulses generated by the photo-electric convertor element 31, to thereby electrically indicate the movement of the vernier 2 on the digital indicator 34.

As shown in FIGS. 6 to 10, forming a rack on the round bar 7 makes it unnecessary to use a rack bar made independently of the main beam body 3 and to fix it in a groove formed in the main beam body 3, as in the prior art.

In the embodiments of the present invention above explained, the main beam body consists of two pieces of round rods, which eliminates punching, and machining and grinding on many faces as has been required in the manufacture of conventional vernier calipers. The only grinding required is of rotating round rods, which are much easier to machine, and require less machining than before. Furthermore, the round bar has higher rigidity than bars of other shapes, which is an advantage in resisting the bending due to heat generated in the machining of the main beam body, and which heat has caused bending of the thin main beam bodies of the conventional vernier calipers. Thanks to the favorable properties of the round rods, the measurement error due to bending of the main beam body can be avoided.

By using round rods, bushes can be used at their sliding contacts, and before assembly a slight gap can be provided between the bushes and the holes of the vernier, making it easy to precisely assemble the vernier onto the main beam body, and giving good sliding movement to the vernier. This advantage permits smaller clearances at the fitting portions between the vernier and the main beam body than in the conventional vernier calipers, which in turn improves accuracy in the measurement.

Furthermore, a depth bar can be placed between the two round rods, without requiring formation of a groove to receive the depth bar in the main beam body as in the previous art of making vernier calipers, and the weight of the vernier calipers is reduced by using round bars, which can be hollow for the main beam body.

What is claimed is:

1. A vernier caliper comprising
    a first measuring jaw;
    a rear frame;
    a main beam body comprising two round rods parallel to each other and extending between said measuring jaw and said rear frame;
    means securing a first end of each round rod to said first measuring jaw;
    means securing the other end of each round rod to said rear frame;
    a slider having a second measuring jaw; and
    means mounting said slider on said two round rods for sliding movement along said rods between said second jaw and said rear frame, and wherein
    one of said rods has graduations,
    a transparent scale plate with graduations is mounted on the slider so as to face said round rod with graduations, and
    a scale groove is formed in said scale plate in opposed relation to said round rod with graduations and extends axially of said rod, said groove having an arch-shaped cross-section, and vernier graduations formed on said scale groove.

2. A vernier caliper as claimed in claim 1, further comprising
    a depth bar between said two round rods and extending slidably through a central portion of said rear frame,
    means securing said depth bar on the vernier,
    an outer end face of said rear frame comprising a standard plane for depth measurement.

3. A vernier caliper as claimed in claim 2 wherein a rack is formed on one of said two round rods, said rack meshes with a pinion supported on the vernier, and an indicator for indicating movement of the vernier is interlinked with said pinion and is mounted on the vernier.

* * * * *